United States Patent [19]

Anderson

[11] 4,319,998
[45] Mar. 16, 1982

[54] MONITOR FOR AN EFFLUENT DISPOSAL SYSTEM

[76] Inventor: John D. Anderson, Court House, Eagle River, Wis. 54521

[21] Appl. No.: 162,905

[22] Filed: Jun. 25, 1980

[51] Int. Cl.³ .............................................. C02C 1/02
[52] U.S. Cl. .................................... 210/86; 210/170; 210/299; 210/532.2
[58] Field of Search .................... 210/86, 93, 103, 104, 210/170, 252, 259, 299, 532 S

[56] References Cited

U.S. PATENT DOCUMENTS

| | | | |
|---|---|---|---|
| 1,608,966 | 11/1926 | Tanaka | 210/299 |
| 1,770,308 | 7/1930 | Herring | 210/86 |
| 3,025,962 | 3/1962 | Williams | 210/86 |
| 3,332,552 | 7/1967 | Zabel | 210/86 |
| 3,460,675 | 8/1969 | Hicks et al. | 210/93 X |
| 3,837,494 | 9/1974 | Stevenson | 210/259 |
| 3,954,612 | 5/1976 | Wilkerson | 210/93 X |
| 4,042,497 | 8/1977 | Maltby | 210/104 X |

Primary Examiner—John Adee
Attorney, Agent, or Firm—Cushman, Darby & Cushman

[57] ABSTRACT

A monitor for an effluent disposal system for preventing suspended solids in an effluent from clogging a disposal field. A separate monitor housing having an inlet and an outlet is installed in the piping interconnecting a septic tank to a disposal field. A screening system in the housing screens out suspended solids. As the solids accumulate on the screening system over a period of time, the fluid level raises, actuating a float operated switch connected to means to signal that the system needs servicing. An additional float operated switch can be provided for indicating saturation of the disposal field.

5 Claims, 7 Drawing Figures

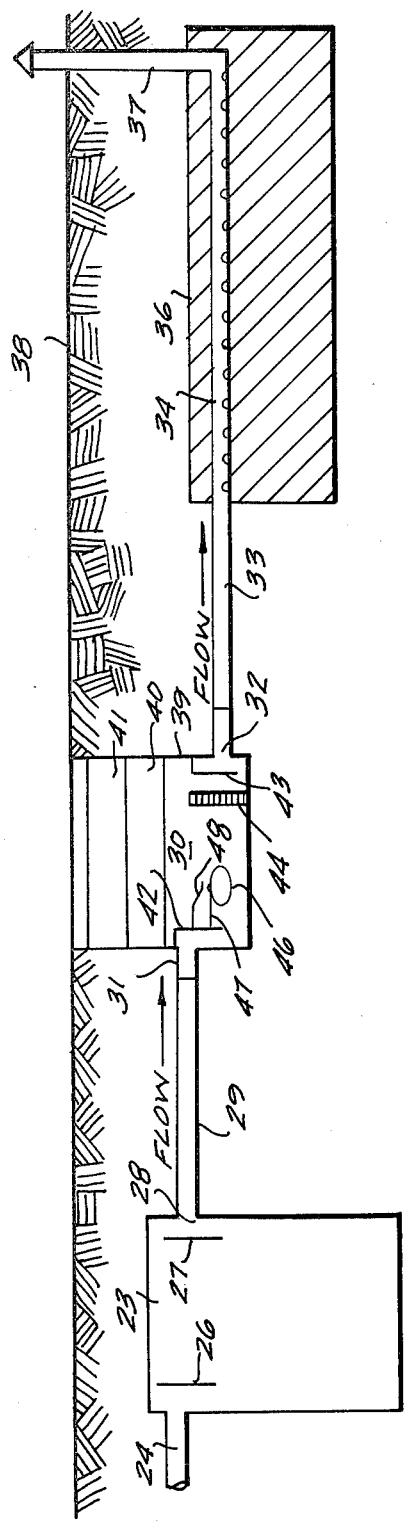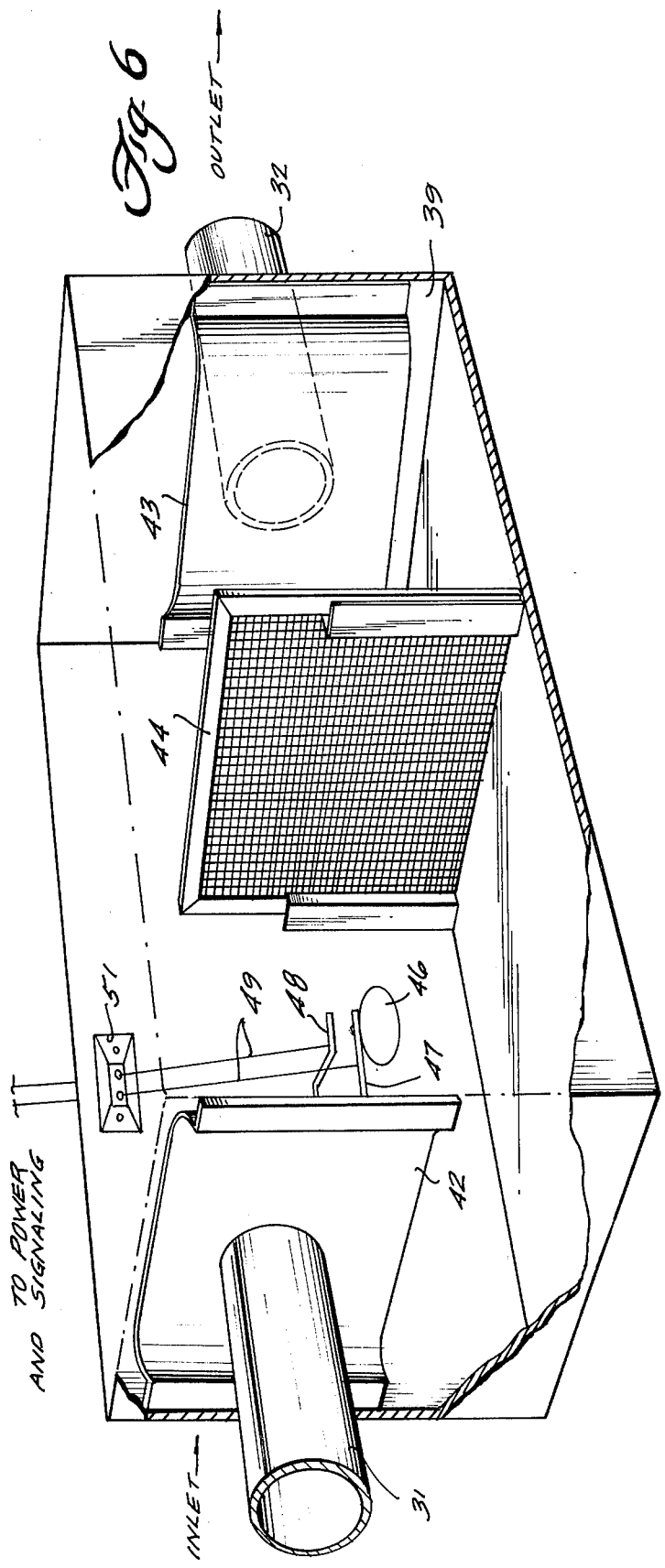

MONITOR FOR AN EFFLUENT DISPOSAL SYSTEM

BACKGROUND OF THE INVENTION

This invention pertains to a monitor for a septic or effluent disposal system, and more particularly pertains to such a monitor for preventing clogging of an effluent disposal field by solids suspended in the effluent.

Effluent disposal systems have a tendency to clog over a period of time, eventually rendering the system useless. The time period until the system clogs depends upon the usage by the individuals in the household. Once a system becomes clogged, the property owner is forced to have a new disposal system installed, which entails much inconvenience and expense.

Septic systems generally comprise a septic tank and effluent disposal field interconnected by piping. The effluent disposal field comprises perforated pipes (having e.g. one-half inch openings) embedded in gravel and buried beneath the surface of the earth. Effluent fluids pass from the septic tank through the interconnecting pipe and to the effluent disposal field, where the fluid leaches into the surrounding gravel and earth.

The problem which generally causes clogging of the septic system is what can be referred to as "suspended solids" in the effluent. These suspended solids are almost invisible in the effluent and are located in the septic tank fluid between the layer of solids at the bottom of the tank and the outlet pipe to the effluent disposal field. As the layer of solids on the bottom of the tank become deeper, as it will in time, the layer of suspended solids is moved upwards into a more concentrated area in the tank. Eventually, the suspended solids move along with the effluent out of the septic tank through the interconnecting piping into the effluent disposal field and begin the process of clogging the system.

There have been some prior art efforts at providing traps or monitors in septic tanks themselves. For example, U.S. Pat. No. 3,025,962 discloses a photocell arrangement for monitoring the sludge build-up layer in a septic tank, so as to provide an indication when the sludge builds up to a level where it could flow out the septic tank outlet into the leaching bed. Such an arrangement, of course, would not be very effective with regard to suspended solids in an effluent, because the effluent with the suspended solids therein is really more in the nature of a transparent medium than opaque such as a sludge.

As another example, U.S. Pat. No. 3,332,552 discloses a trap arrangement for incorporation within a septic tank itself. A signaling means is provided in the septic tank adjacent the trap to provide an indication when the trap clogs with sludge or undigested solids.

It should be appreciated that both of the constructions disclosed in the patents referred to above relate to devices or mechanisms incorporated within the septic tank itself. This entails at least two problems. First, septic tanks are conventionally buried at some distance underneath the surface of the earth, so that access to them for cleaning a trap for example, is not easy or convenient. Secondly, it would not be easy or convenient to modify existing septic tanks to accommodate the mechanisms disclosed in the above patents.

As another example of indicators for septic systems, U.S. Pat. No. 3,954,612 discloses a float indicator to provide an indication of the liquid level in the leaching bed. Such a system does not really provide any indication of impending clogging of the system, however. Rather, it merely shows when the gravel or earth of the leaching bed is saturated with water or fluid.

OBJECTS AND SUMMARY OF THE INVENTION

It is an object of this invention to provide a monitor for a septic or effluent disposal system which overcomes the disadvantages of the prior art.

More specifically, it is an object of this invention to provide a septic system monitor for monitoring suspended solids in an effluent, so as to prevent clogging of the effluent disposal bed that would result from the suspended solids being discharged therein.

It is another object of this invention to provide a septic system monitor which can be easily incorporated in existing septic systems, and in which access to and servicing of the monitoring apparatus is facilitated.

In accordance with one aspect of the invention, in an effluent disposal system which includes an upstream septic tank and a downstream effluent disposal field, a septic monitor is interposed in the piping which interconnects the septic tank to the disposal field. The septic monitor comprises a housing having an inlet and outlet for coupling to the piping. Screening means is mounted in the housing for intercepting the effluent flow therethrough. Suspended solids in the effluent are collected on the upstream side of the screening means. Indicating means is provided which is responsive to a predetermined accumulation of suspended solids on the screening means to provide an indication that the effluent disposal system requires servicing.

Other objects and advantages of the present invention will appear from the following description taken in connection with the accompanying drawings.

BRIEF DESCRIPTION OF THE DRAWINGS

FIG. 5 is a diagrammatic view of a septic system incorporating the monitor of the present invention in the piping interconnecting the septic tank to the effluent disposal field.

FIG. 6 is a perspective view of a monitor system in accordance with the present invention showing the arrangement of parts therein.

DETAILED DESCRIPTION

Figure 2:
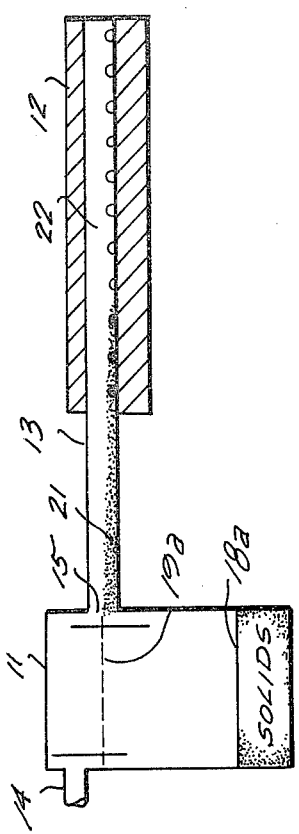
FIGS. 1 through 4 show a conventional septic system consisting of a septic tank connected to a piping to an effluent disposal field and show the progress of the build-up of solids in the septic tank over the years, leading to clogging of the effluent disposal bed by suspended solids.

Referring to the drawings, and in particular FIGS. 1 through 4, FIG. 1 illustrates a conventional septic system consisting of a septic tank 11, effluent disposal bed 12, and piping 13 interconnecting the two. The septic tank 11 has an inlet 14 and an outlet generally indicated by reference numeral 15. Adjacent the inlet and outlet of the septic tank are baffles 16 and 17 in accordance with conventional practice.

Figure 1:
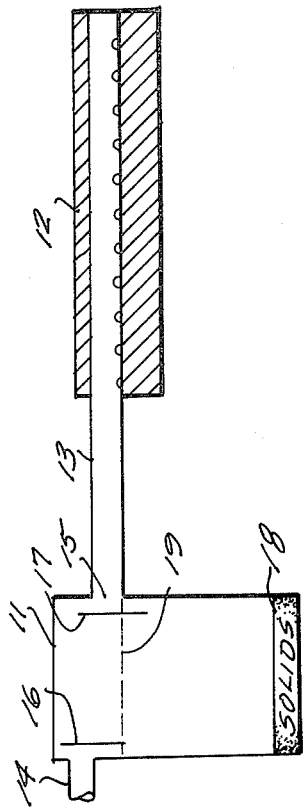

FIG. 1 illustrates the condition of such a septic system when it has been in use for a relative short period of time, such as 0 to 3 years, for example. In such condition there will be a build-up of solids or sludge 18 to a relatively low level as indicated in FIG. 1 and the liquid level, as generally indicated by reference numeral 19, will be at the level of the outlet 15.

FIG. 2 illustrates the same system after a longer time period has elapsed, such as 3 to 6 years, for example. As can be seen in FIG. 2, there is a deeper layer of solids or sludge, shown by level 18a. In any septic tank, there is a substance commonly known as suspended solids. The suspended solids are almost invisible and are located in the septic tank fluid between the layer of solids at the bottom of the tank and the outlet pipe to the effluent disposal field. As time goes on and the layer of solids on the bottom of the septic tank becomes deeper, the layer of suspended solids is moved upwards into a more concentrated area in the tank. The inevitable result is that eventually the suspended solids move, along with fluid, out of the septic tank into the connecting pipe and the effluent disposal field. Thus begins the process of clogging the system. In FIG. 2, there is illustrated a build-up of these suspended solids indicated by reference numeral 21 in the interconnecting pipe 13. As further shown in FIG. 2, this build-up of the suspended solids can extend into the perforated pipe 22 of the effluent disposal field 12, occluding some of the openings or perforations therein and beginning clogging of the system. As also shown in FIG. 2, the build-up of suspended solids 21 in the interconnecting pipe 13 raises the liquid level in the septic tank to a higher level 19a.

Figure 3:
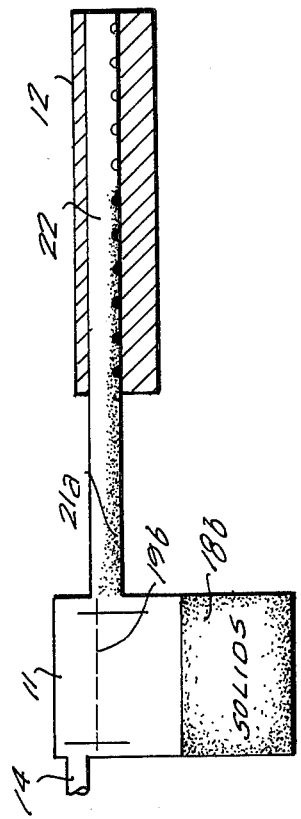

FIG. 3 shows the system of FIG. 2 some time later, such as after an elapsed time period of 2 to 3 additional years, in which the solids in the septic tank have built up to a level 18b, causing a higher build-up of solids in the interconnecting pipe 13 to a level 21a, and also causing more extensive build-up of solids in the perforated pipe 22. Concurrently, because of the increased build-up in the interconnecting pipe 13 at the outlet 15 of septic 11, the liquid level in the septic tank is raised to a higher level 19b.

Figure 4:
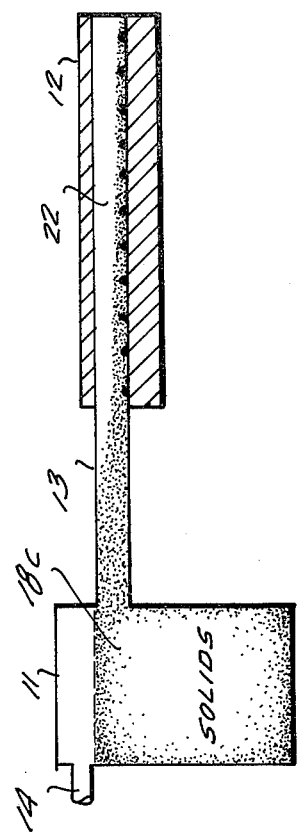

FIG. 4 shows the condition of the system at a later date, such as 2 to 3 years later than as shown in FIG. 3. Here, the solids have built up a level 18c, so as to totally obstruct the outlet of the septic tank 11. The interconnecting pipe 13 is substantially blocked and at least major portions of the perforated pipe 22 in the effluent disposal bed are clogged.

Once an effluent disposal system has reached the condition as illustrated in FIG. 4, the system is useless. The property owner is forced into having a new disposal system installed, which entails much inconvenient and expense.

Referring now to FIG. 5, there is shown a diagrammatic view of a septic monitoring arrangement in accordance with the present invention. A septic tank 23 is provided which has an inlet 24 coupled to the waste plumbing of a house. The septic tank 23 has a baffle 26 adjacent the inlet 24 and a baffle 27 adjacent to an outlet 28. Piping 29 couples the outlet 28 to an inlet 31 of monitor 30. Monitor 30 also has an outlet 32 connected by piping 33 to perforated pipe 34 buried in an effluent disposal field 36. In accordance with one aspect of conventional practice, the perforated pipe 34 may be connected to a vent system 37 which extends above the ground surface 38.

The monitor 30 comprises a housing generally shown in FIG. 5 as comprising housing portions 39, 40 and 41. Preferably, the housing for the monitor is provided in a basic housing portion 39, with vertically stackable housing portions such as 40 and 41 being provided in sufficient number to extend the housing adjacent to the ground surface 38. Such an arrangement facilitates access to the housing portion 39 for periodic servicing, as discussed in more detail hereafter. Although two additional vertically stackable segments 40 and 41 are shown in FIG. 5, obviously more or less could be used depending upon how many vertically stackable housing portions are necessary to reach from the buried monitor location to adjacent the ground surface. In accordance with the invention, the housing portions 39, 40 and 41 are made of a non corrosive material, such as plastic, for example, and may be provided on their mating edges with tongue and groove arrangements for assembling one to the other in a convenient manner.

Inside the housing member 39 there is disposed a baffle 42 adjacent inlet 31. A baffle 43 is disposed adjacent outlet 32 and a screen 44 is suitably mounted between inlet 31 and outlet 32. A float operated switch, comprising for example, a float member 46 and electrical contacts 47 and 48, is suitably rigidly mounted, such as by attachment to baffle 42, in housing 39 upstream of the screen 44.

With particular reference to FIG. 6, it can be seen that the electrical contacts 47 and 48 are suitably connected as by wire 49 to an electrical feedthrough 51 located in a wall of housing portion 39. As diagrammatically illustrated in FIG. 6, electrical connection is made to the outside of the electrical feedthrough 51 for connection to a remote source of power and signaling arrangement. For example, the two wires 52 can be connected in a series circuit comprising a battery or other source of power and a simple electrical light located in a dwelling.

In operation, as effluent containing suspended solids is admitted over a period of time through inlet 31, the suspended solids are screened or filtered by screening means 44, so that only clear effluent relatively free from solids passes through screen 44 and outlet 32 to the effluent disposal field. Over a period of time, if there are suspended solids in the effluent flowing through inlet 31, they will become coated on screen 44. This coating of solids on screen 44 will cause the fluid level in the housing portion 39 to rise on the inlet side of screen 44. As the fluid level rises, the float member 46 will be carried upward by the rising fluid level, so that electrical contact 47 makes contact with electrical contact 48. This completes an electrical circuit and lights, for example, an indicator light located in the dwelling. When this occurs the homeowner will know that it is time to have the septic tank pumped out because suspended solids are being carried out of the septic tank into the interconnecting piping. At that time also, the screen 44 can be removed to either clean and reinstall it or to replace it if it is not in a reasonable condition.

Of course, various modifications are possible to the preferred embodiment shown in FIG. 6 without departing from the spirit and principles of the invention. For example, instead of only having one screen 44 of a constant mesh, a series of screens of varying mesh could be removably mounted within the housing portion 39. Also, instead of having a simple single pole, single throw float operated switch, a more complicated switching arrangement could be utilized. For example, a third electrical contact could be provided that normally makes contact with the electrical contact on which the float member is mounted. In this manner, one electrical circuit, to a green indicator light, for example, could be activated with the float switch in its normal position. Upon occurrence of a rising fluid level in the monitor, the float switch would then disconnect that circuit to the green light and complete another circuit connected to, for example, a red light. Various other modifications are, of course, possible.

Figure 7:
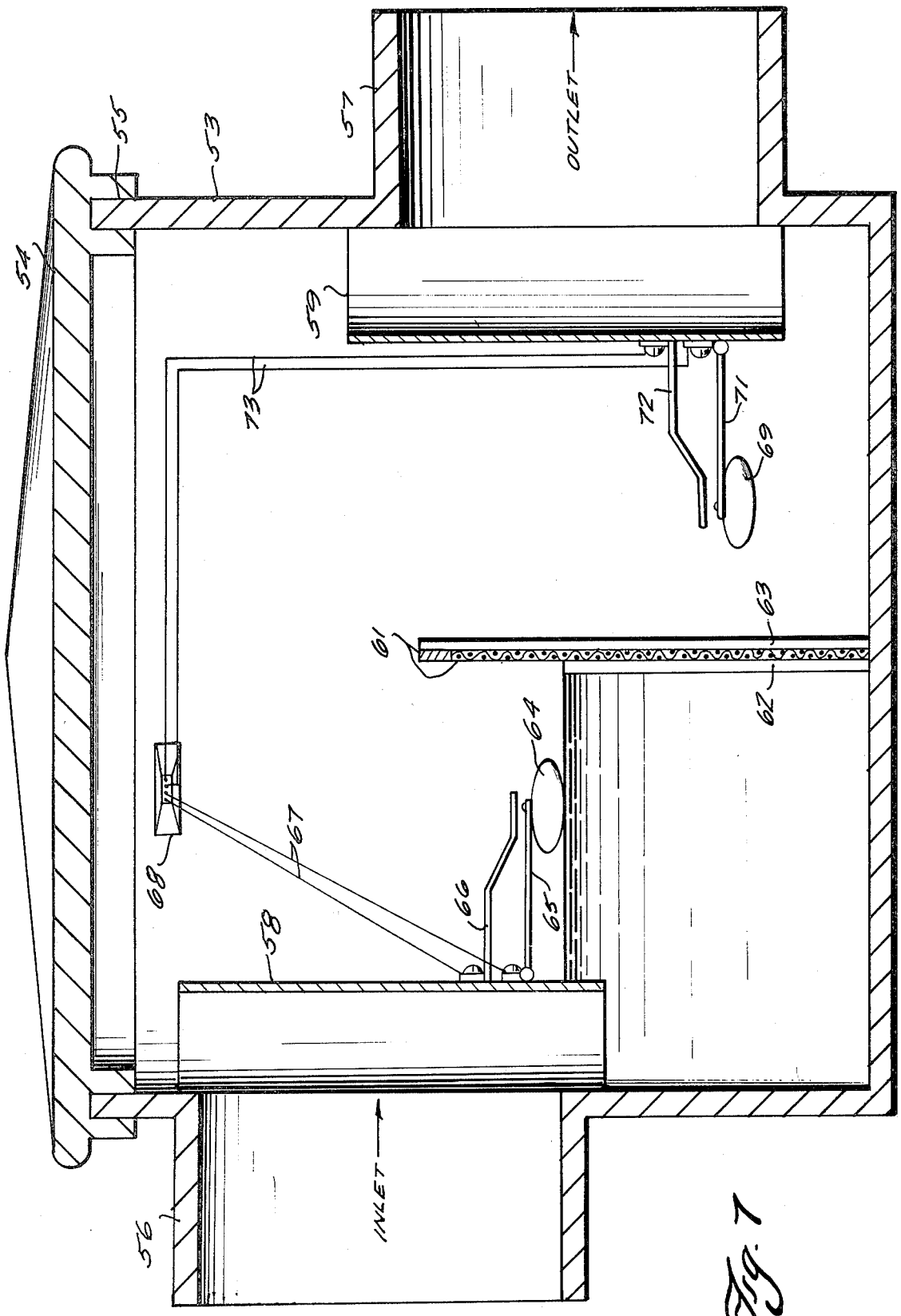
FIG. 7 is a front sectional elevation of another embodiment of the invention incorporating two signaling means.

Referring now to FIG. 7, there is illustrated another embodiment of the present invention in which two separate signaling means are utilized. In FIG. 7, a housing member 53 is illustrated as having a cover or lid 54 attached thereto through a tongue and groove arrangement generally indicated by reference numeral 55. As previously discussed, further housing members or segments can be vertically stacked on housing member 53 through mating tongue and groove arrangements with the lid or cover 54 being affixed to the topmost housing member. The housing member 53 has an inlet 56 and an outlet 57. A baffle 58 is positioned adjacent the inlet 56 and a baffle 59 is positioned adjacent the outlet 57. A screen 61 is positioned within the housing 53 and suitably supported by screen supports 62 and 63. As before, a float operated switch comprising float member 64, electrical contact 65, and electrical contact 66 is suitably rigidly mounted within the housing 53 on the upstream side of screen 61. As illustrated, the float switch arrangement may be affixed to the baffle 58. Wires 67 connect the electrical contacts 66 and 65 to an electrical feedthrough 68 mounted in the wall of housing 53.

In the arrangement of FIG. 7 an additional float operated switch comprising float member 69, electrical contact 71 and electrical contact 72 is positioned within the housing 53 on the upstream side of screen 61. The electrical contacts 71 and 72 are connected by wires 73 to the electrical feedthrough 68 in the wall of housing 53.

In operation, the principal of the float switch comprising float members 64, electrical contact 65 and electrical contact 66 is the same as with respect to the embodiment of FIGS. 5 and 6. That is, as suspended solids from the effluent collect on screen 61 they cause the fluid level to rise, ultimately causing electrical contact 65 to contact electrical contact 66, causing an indication or signal in suitable signal circuitry, such as a power supply and light, electrically coupled to the electrical feedthrough 68.

The principal of the float operated switch comprising float member 69, electrical contact 71 and electrical contact 72 is similar, except that this float operated switch can be utilized to provide an indication to the homeowner that the effluent disposal field to which outlet 57 is connected is completely saturated. That is, if the fluid level at the outlet 57 rises, due, for example, to complete fluid saturation of the effluent disposal field, the rising fluid level will cause float 69 to carry electrical contact 71 upwards into contact with electrical contact 72. A suitable signaling arrangement, such as a power source and a light electrically coupled through electrical feedthrough 68 to the wire 73, can then be activated. Such a signal could serve as a warning to the homeowner that the effluent disposal field was saturated, so that the homeowner would know not to discharge more waste into the septic system until this condition was alleviated.

It should be clear by now that the present invention is advantageous in that it provides a monitor that is entirely separate from the septic tank. Thus the monitor can be easily accessible for servicing, and can be easily applied to existing septic tank installations.

While the present invention has been described with reference to present particularly preferred embodiments thereof, it is obvious that various modifications may be made to the precise embodiments disclosed herein without departing from the true spirit and scope of the invention.

What is claimed is:

1. In an effluent disposal system including an upstream septic tank, a downstream effluent disposal field, and piping interconnecting the septic tank to the disposal field, a septic monitor interposed in the interconnecting piping for monitoring suspended solids in the effluent passing through the interconnecting piping comprising, a housing having an inlet and an outlet for coupling to the interconnecting piping, screening means mounted in said housing for continuously intercepting effluent flow therethrough, with suspended solids in the effluent being continuously collected on the upstream side of said screening means, said screening means being removable for periodic servicing, and automatic indicating means automatically responsive to an increased effluent level in said housing upstream of said screening means caused by a predetermined accumulation of suspended solids on said screening means to automatically provide an indication that the effluent disposal system requires servicing.

2. A septic monitor in accordance with claim 1 in which said automatic indicating means comprises float operated signaling means adjacent said screening means upstream thereof and responsive to an increased level of effluent in said housing due to collection of suspended solids on said screening means, to provide the indication.

3. A septic monitor in accordance with claim 1 in which said housing is buried in the ground and includes a portion thereof extending adjacent the surface of the ground for facilitating periodic access to said housing for periodic servicing of said screening means.

4. A septic monitor in accordance with claim 3 in which said housing is comprised of a selectable number of vertically interlocking sections, for facilitating providing a housing portion adjacent the ground surface for any particular depth of the interconnecting piping beneath the ground surface.

5. A septic monitor in accordance with claim 2 including additional float operated signaling means downstream of said screening means adjacent said outlet of said housing, for providing an additional signal in response to a predetermined effluent depth on the downstream side of said screening means as an indication of saturation of the effluent disposal field.

* * * * *